US012748824B2

(12) United States Patent
Kiely

(10) Patent No.: US 12,748,824 B2
(45) Date of Patent: Sep. 29, 2026

(54) METHOD OF, AND A SYSTEM FOR, OPTIMIZING COPYRIGHT PROTECTION WITHIN A GENERATIVE ARTIFICIAL INTELLIGENCE (AI) SYSTEM

(71) Applicant: IAIAI TECHNOLOGIES LIMITED, Tulla (IE)

(72) Inventor: Michael Kiely, Tulla (IE)

(73) Assignee: IAIAI TECHNOLOGIES LIMITED, Tulla (IE)

( * ) Notice: Subject to any disclaimer, the term of this patent is extended or adjusted under 35 U.S.C. 154(b) by 135 days.

(21) Appl. No.: 18/932,939

(22) Filed: Oct. 31, 2024

(65) Prior Publication Data

US 2025/0139205 A1 May 1, 2025

(30) Foreign Application Priority Data

Nov. 1, 2023 (IE) .................................... 2023/0460

(51) Int. Cl.
*G06F 21/10* (2013.01)

(52) U.S. Cl.
CPC ...... *G06F 21/1012* (2023.08); *G06F 21/1015* (2023.08)

(58) Field of Classification Search
CPC ............... G06F 21/101; G06F 21/1012; G06F 21/1015; G06F 21/16
See application file for complete search history.

(56) References Cited

U.S. PATENT DOCUMENTS

| | | | | |
|---|---|---|---|---|
| 11,301,452 B2 * | 4/2022 | Chan | G06F 16/2365 |
| 2010/0161575 A1 * | 6/2010 | Basso | G06F 16/219 707/705 |
| 2015/0347971 A1 * | 12/2015 | D'Amore | G06Q 10/101 705/300 |
| 2025/0131928 A1 * | 4/2025 | Drolet | G10L 19/018 |

OTHER PUBLICATIONS

International Search Report corresponding to Application No. PCT/EP2024/080610, issued Dec. 20, 2024.
Koh, P. and Liang, P., "Understanding Black-box Predictions via Influence Functions", International conference on machine learning, 2017, pp. 1885-1894.
Balan, K. et al., "EKILA: Synthetic Media Provenance and Attribution for Generative Art", Proceedings of the IEEE/CVF Conference on Computer Vision and Pattern Recognition, 2023, pp. 913-922.
Balan, K. et al., "DECORAIT—DECentralized Opt-in/out Registry for AI Training", Proceedings of the 20th ACM SIGGRAPH European Conference on Visual Media Production, 2023, pp. 1-10.

* cited by examiner

*Primary Examiner* — Shanto Abedin
(74) *Attorney, Agent, or Firm* — Hoffmann & Baron, LLP

(57) ABSTRACT

A system and method of optimizing copyright protection within an Artificial Intelligence (AI) system, includes analysing an original copyright work to formulate a unique creative digital DNA profile of the work; storing one or more analysed copyright works, along with their digital creative DNA profiles; and upon a generative Artificial Intelligence (AI) model creating a new derivate work, tracing reference training data of the derivative work to identify one or more original copyright works that have informed the new derivative work.

78 Claims, 5 Drawing Sheets

METHOD OF, AND A SYSTEM FOR, OPTIMIZING COPYRIGHT PROTECTION WITHIN A GENERATIVE ARTIFICIAL INTELLIGENCE (AI) SYSTEM

This application claims the benefit of priority to Irish Patent Application No. S2023/0460 filed Nov. 1, 2023, the contents of which are incorporated by reference herein for all purposes.

The present invention relates to a method of, and a system for, optimizing copyright protection within a generative Artificial Intelligence (AI) system.

BACKGROUND TO THE INVENTION

It will be appreciated by those in the industry, that the uneasy overlap between generative Artificial Intelligence (AI) and copyright law may result in several complex problems developing for copyright holders as well as technology users and developers. More particularly, the use of generative Artificial Intelligence (AI) causes significant problems in identifying and enforcing copyright.

As such, it will be appreciated that there is a desperate need for a plan that considers the legal and ethical implications of technology, to make sure AI develops in the right way, i.e., that it respects copyright. Copyright holders claim that AI often makes use of data that is copyrighted, without permission or payment. This is also a problem ethically, because it's important to respect the rights of people who create original work. The problem on the one hand is that generative AI has the potential to develop amazing new things. On the other hand, there need to be mechanisms in place to ensure that it does not infringe upon copyright holders through these developments.

One of the most pressing challenges lies in the inherent working of AI models. Generative AI learns and replicates patterns in human-created copyrighted data, raising questions about infringement and rights of use.

Further, there's significant ambiguity about the ownership of AI-generated content. For instance, should the copyright be assigned to the AI developers, the original data creators, or the AI itself. This has resulted in many legal battles, an example being the dispute over the ChatGPT model's output. More and more, the issue of unlicensed content arises, as AI can unwittingly use copyrighted data during its learning process, potentially leading to infringement claims.

In the US, copyright law doesn't currently extend to works solely created by a machine. This becomes contentious when considering works that have been generated without substantial human input. An illustrative case is the US Copyright Office's decision to grant a registration for a comic book generated with AI's assistance. This matter is currently under review before the Copyright Office to determine the extent of actual human involvement.

The gravity of the issue lies in the substantial legal implications. The AI industry is grappling with an alarming increase in lawsuits filed by copyright holders against AI companies, signaling a strenuous conflict between technological innovation and intellectual property rights. The intricacy of detecting copyright infringements, coupled with the challenges posed by compliance with intellectual property laws, complicate the issue.

There is an urgent need for innovative solutions and improved legal frameworks that can effectively address these issues, balancing the rights of copyright holders with the progress of AI technologies.

There is also an urgent need for an invention and method for analyzing and protecting all aspects of copyright associated with the arts. For example, in recorded music, there are music structures and music performances of musical instruments and indeed the performance and singing of the human voice which importantly contributes the copyright. In this instance, the human Voice, herein referred to as a Voice DNA Protection System which safeguards the unique vocal characteristics of individuals against unauthorized cloning, exploitation, or misuse. The Voice DNA system utilizes advanced biometric analysis techniques to generate digital profiles of individuals' vocal patterns, providing a robust mechanism for voice authentication, copyright protection, and forensic analysis in cases of infringement. Also described here are methods to also detect other aspects of a musical recording copyright which relates to the musical structure of a piece (recorded and written), it's related instrument parts and the recordings of those instruments and parts.

SUMMARY OF THE INVENTION

According to a first aspect of the invention, there is provided a method of optimizing copyright protection within an Artificial Intelligence (AI) system, including one or more of the following steps:

- analysing an original copyright work to formulate a unique creative digital DNA profile of the work;
- storing one or more analysed copyright works along with their creative digital DNA profiles; and
- upon a generative Artificial Intelligence (AI) model creating a new derivate work, tracing reference training data of the derivative work to identify one or more original copyright works that have informed the new derivative work.

In an embodiment, the step of storing one or more analysed copyright works includes the step of establishing a content structure within the Artificial Intelligence (AI) system. In this embodiment, the content structure outlines a central repository, such as a database, of the copyright works. In an example of this embodiment, each of the copyright works in the database will be automatically examined in detail before being allocated a distinct creative digital DNA profile. In an embodiment, original copyright works are preserved, monitored, and faithfully transmitted. In this embodiment, copyright holders for each piece of data are meticulously identified and documented, involving extensive cross-referencing and verification for accuracy.

In this embodiment, the database is provided in the form of a databank for all copyright holders and the unique creative digital DNA profiles associated with their copyright works. In this embodiment, the creative digital DNA profile and copyright database may be licensed to a third party, such as a developer for use in training their AI model. In this embodiment, the system is accessed by third-party AI developers and used to keep new generative works safe from copyright infringement.

In an embodiment of the invention, upon the Artificial Intelligence (AI) system creating a new derivate work, the method includes the step of identifying all the associated artists and rights holders who have influenced the new derivative work, to enable the artists and rights holders to be attributed as copyright beneficiaries of the derivate work.

In an embodiment, upon a generative AI model creating a new derivate work it first commences its training process. In this embodiment, the generative AI model is built for the purpose of monitoring copyrighted data use. In this embodiment, as the generative AI model generates derivative works, it continually tracks the use of copyrighted data, ensuring no loss of information.

In an embodiment, the generative AI model is operable to provide details of the original copyright holders. In this embodiment, the model ensures that parent works are duly acknowledged and credited, to thereby preserve the rights and ensure recognition of the original creators and rights holders.

In some embodiments, a methodology, algorithm or set of criteria for copyright works identification can be provided within an application tool. In some embodiments, copyright works identification is facilitated through auto-training which includes one or more feedback loops. Thus, upon identifying use of a copyright work, the copyright classification information (or reference data information related to what constitutes copyright work) can be fed back (e.g., a recursive loop) to the auto-training process for subsequent copyright identifications. Some embodiments comprise an automated learning model. Some embodiments comprise a simplified method for configuring data overlap for false positives vs. false negatives. Some embodiments comprise a slider or other control for adjusting parameters of interest. In some embodiments, the new derivate work can be uploaded to the AI model and its origin accurately traced back the copyright work which influenced the AI model in initially creating the new derivative work.

In an embodiment of the invention, the unique creative digital DNA profile will be allocated to the respective copyright holder(s) work. In this embodiment, each of the copyright holder(s) is provided with the option of providing training permission for their copyright work, in terms of which their digitally DNA profiled work is made available for AI model training. In this embodiment, only copyright works with training permissions will be eligible for training. In this embodiment, digital profiles without training permission will be prevented from being accessed for AI model training purposes. In this embodiment, all new derivate works derived from the AI systems will have copyright holder permissions. In this embodiment, all new derivate works will be attributed to the correct copyright holder(s) via a lineage check by documenting the lineage at the time of generation of the new derivative work, thus accurately tracing development right back to the original rights holders and their works that influenced the AI model. In this embodiment, copyright holder(s) are provided with assurance that if their copyright work is used for training the AI model, they will own or co-own the copyright to any derivate work that can be proven to have been influenced by their original work via the unique digital profile attributed to it. In this embodiment, the copyright holder(s) can be provided with ownership, either whole or partial, and a potential share of revenues from royalties or the exploitation of the new derivative work.

In an embodiment, the AI model employs a sophisticated algorithm to scrutinize digital Master Works, allowing for a unique digital creative DNA profile to be created for each of the copyright works it scrutinizes albeit a literary, artistic or musical work such as music, books, photo images, paintings, films, sculpture, and the like.

In an embodiment, method includes employing a generative or creative AI model, resembling a large language model (LLM), which generates new content. In the above embodiment, the AI model is trained on the library of books while considering the unique digital profile of each work. In this embodiment, the AI model actively tracks and records creative digital influences during content generation.

In an embodiment, the method includes employing a tracing and attribution algorithm. In this embodiment, the method includes comparing the unique digital profile of newly generated AI content with that of original works in the database. In this embodiment, the algorithm is operable to attribute influences and potential copyright ownership based on identified similarities.

In an embodiment, the method includes employing a copyright attribution report generator. In this embodiment, the copyright attribution report generator compiles essential information, including the newly created work, its unique digital creative DNA profile, and traced influences to generate a copyright attribution report. In this embodiment, the report serves as a comprehensive record for copyright attribution purposes.

In an embodiment, the method includes employing an algorithmic analysis and profile assignment methodology. In this embodiment, the method includes analysing a database of several million images. In this embodiment, each image is assigned a unique digital creative DNA profile, such as a digital fingerprint, that encapsulates the images distinct artistic elements.

In an embodiment, the method includes an AI training and digital profile recording methodology. In this embodiment the method includes following the unique profile assignment, a generative AI model is trained on the library or content database. In this embodiment, the AI model is operable to learn and assimilate the digital profile of each image. In this example embodiment, as the AI model generates new art, it simultaneously records the creative digital influences from the original images it was trained on.

In an embodiment, the method includes tracing and attribution of digital creative DNA profiles. In this embodiment, a tracing and attribution algorithm is employed to compare the unique digital profiles of AI-generated images with the original images' digital profile in the database. In this embodiment, the algorithm is operable to identify and pinpoint the sources of influence in the new work, thus establishing a definitive creative DNA lineage of unique digital profiles from original works to new works.

In an embodiment, the method includes generating a copyright attribution report. The copyright attribution report generator includes a compilation of all the information into a comprehensive report. In this embodiment, the report provides a clear and accurate attribution of copyright to the original artists or copyright holders whose works influenced the AI's output.

According to a second aspect of the invention, there is provided a system for optimizing copyright protection within an Artificial Intelligence (AI) system, including one or more of the following steps:

- a means of analysing an original copyright work to formulate a unique digital creative DNA profile of the work;
- a means of storing one or more analysed copyright works along with their digital creative DNA profiles; and
- a means of, upon a generative Artificial Intelligence (AI) model creating a new derivate work, tracing reference training data of the derivative work to identify one or more original copyright works that have informed the new derivative work.

In an example embodiment of the invention, the system analyses each book within a database, assigning a unique digital profile to each work. It evaluates literary elements like theme, style, character development, and plot structure to generate distinctive identifiers.

In an embodiment, the system accesses a database containing a broad range of video clips or movies. In this embodiment, the system analyses the video/film content stored in the database, breaking down each video/film into its essential elements, and assigning each a unique digital creative DNA profile. In this embodiment, the essential elements may include plot, character development, cinematography, sound design, actor voice dialog and more.

In an embodiment, the system traces the AI-generated work's creative DNA back to its original sources in the database. In this embodiment, the system is operable to accurately attribute copyright to the original creators and copyright holders, based on the creative DNA tracing.

In an embodiment, the system includes a creative digital profile analysis algorithm. In this embodiment, the algorithm is operable to analyse each patent within a database, assigning a unique digital profile to each patent. In this embodiment, is operable to evaluate novel and inventive elements of the patents and associated citations.

In an embodiment, the system includes a creative AI model, resembling a large language model (LLM), which generates new content. In this embodiment, the AI model is trained on the database of patents while considering the unique digital profile of each invention. In this embodiment, it actively tracks and records unique digital profile influences during new and novel invention generation.

In an embodiment, the system includes a tracing and attribution algorithm. In this embodiment, the tracing and attribution algorithm compares the unique digital profile of a newly generated AI invention with that of prior art in the database. In this embodiment, the algorithm is operable to attribute influences and potential inventive ownership based on identified similarities.

In an embodiment, the system includes a copyright attribution report generator. In this embodiment, the copyright attribution report generator compiles essential information, including the newly created novel invention, its unique digital profile, and traced prior art influences. In this embodiment, the report serves as a comprehensive record for inventor attribution purposes.

In an embodiment, the system includes a methodology for scanning 3-dimensional (3D) sculptures and other 3-dimensional art for compilation of or more 3-dimensional maps into a data bank. In this embodiment, each 3-dimensional map is assigned a unique digital Creative DNA profile.

In an embodiment, the system includes a generative AI 3-dimensional printing model. In this embodiment, the AI model is used to create new 3-dimensional art through 3D printing. In this embodiment, the AI model is operable to enable 3D mapping of the generated work to be analysed and influencing copyright to be assigned to the new work.

In an embodiment, the system includes a Voice DNA generation module responsible for capturing and analyzing the distinctive vocal characteristics of individuals. This module employs advanced signal processing algorithms to extract key vocal parameters, including pitch, tone, timbre, and pronunciation, and encode them into digital Voice DNA profiles, safeguarding against unauthorized cloning, imitation, or exploitation by third parties. Vocal DNA technology offers unprecedented capabilities for voice cloning and dubbing. By analyzing the vocal DNA of actors, singers, voice artists or any human voice, music artists, actors, filmmakers and content creators can protect their song performances in a music copyright and dialog performances in film or radio plays etc. from being exploited or cloned by generative AI without permissions.

Alternatively singing artists and actors can permit their voices to be used in the training of generative AI for dubbing purposes or even to generate entirely new performances, expanding the possibilities for creative storytelling and localization allowing also for attribution and compensation when their voices have been replicated by an AI.

The present invention addresses another critical problem within the realm of copyright management. The system allows for the input of derivative works generated by any third-party generative AI system. Upon analysis, the system can identify the copyrights involved and their respective holders, providing accurate attribution regardless of when the derivative work was created.

Additionally, the system can determine whether the copyrights that influenced the AI during the creation of the derivative had received proper training permissions. This crucial capability clarifies the ongoing debate surrounding the opt-out argument, demonstrating that once a model has been trained on the relevant copyright, opting out becomes effectively impossible.

BRIEF DESCRIPTION OF THE DRAWINGS

These and other features of this invention will become apparent from the following description of one example described with reference to the accompanying drawings in which.

DETAILED DESCRIPTION

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptions to the present invention are possible and can even be desirable in certain circumstances and are a part of the present invention. Thus, the following description is provided as illustrative of the principles of the present invention and limitation thereof.

Figure 1:
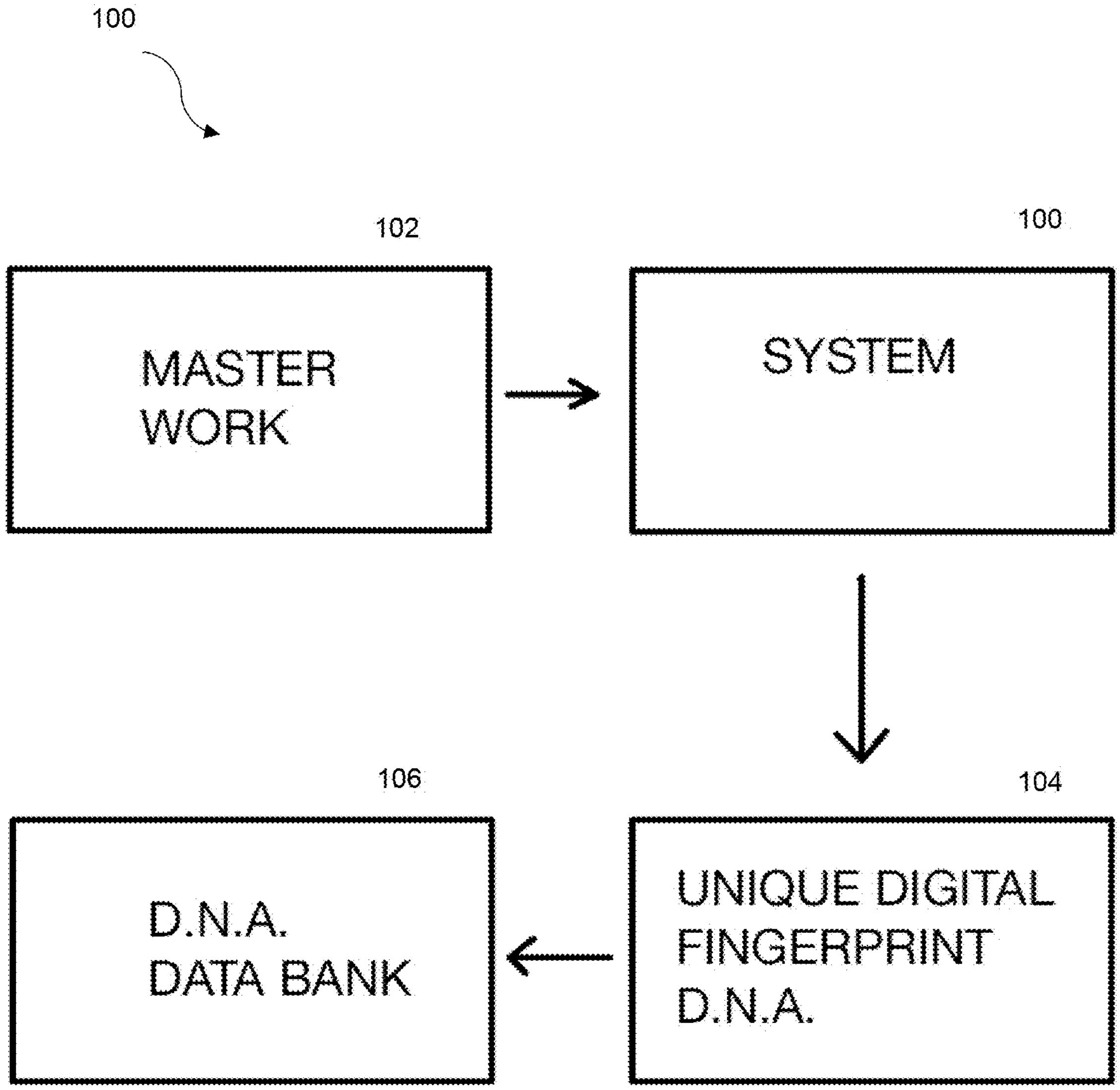
FIG. 1 shows a system for optimizing copyright protection within an Artificial Intelligence (AI) system, in accordance with an aspect of the invention.

In FIG. 1, a system for optimizing copyright protection within an Artificial Intelligence (AI) system, in accordance with an aspect of the invention, is generally described with reference to numeral 100.

In use, the system 100 includes a master work 102, which is uploaded to the system 100. In turn, the system 100 analyses the master work 102 and creates a unique digital fingerprint (akin to DNA) 104 for the master work 102. The associated digital profile 104 is linked to the human authors and copyright owners of the master work 102.

The original master work's unique digital fingerprint or digital profile 104 is stored in a databank 106 for retrieval during lineage assessment and search at the time of AI generating new or derivative works.

Figure 2:
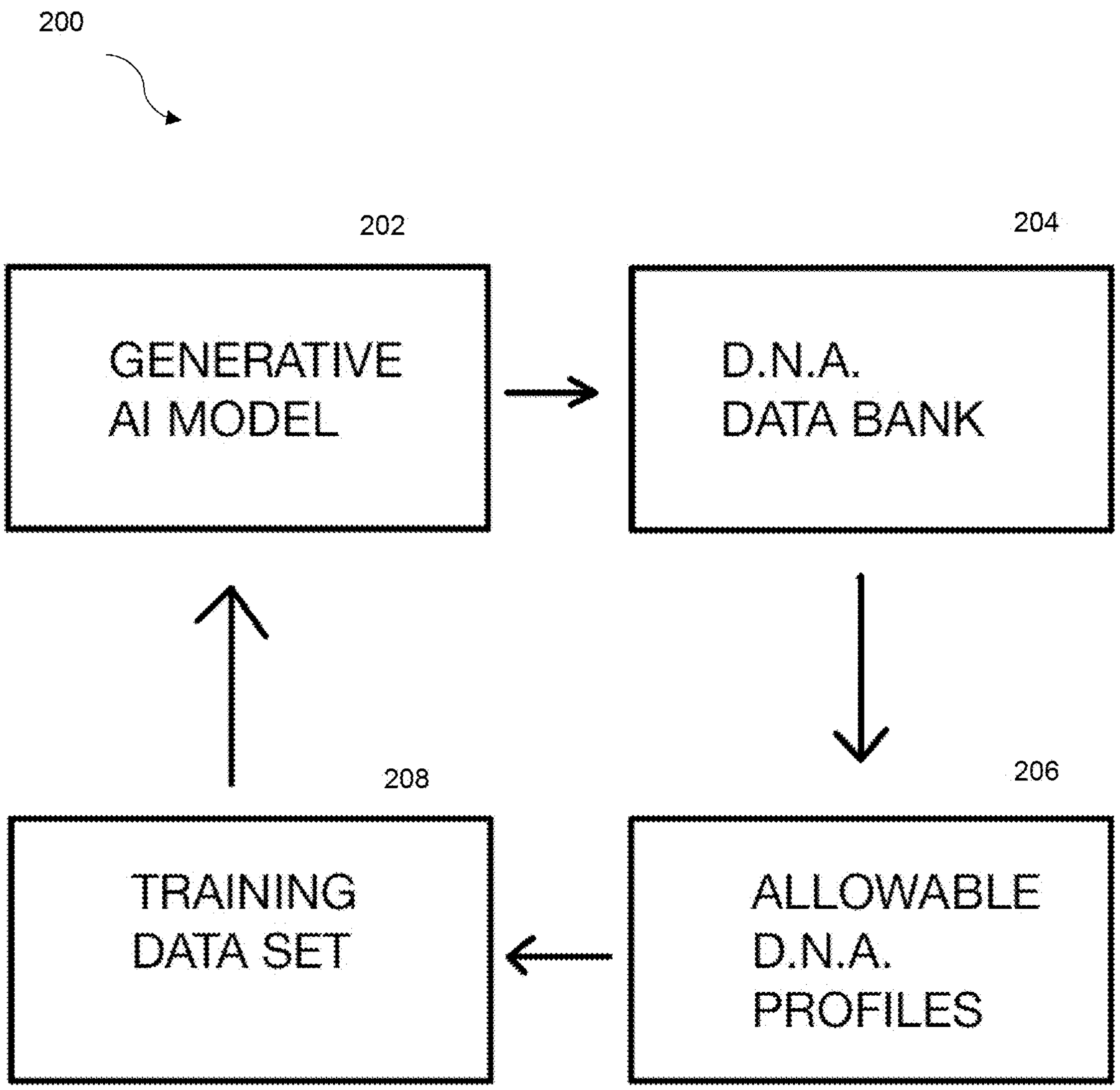
FIG. 2 shows a system for optimizing copyright protection within an Artificial Intelligence (AI) system, in accordance with an aspect of the invention.

In FIG. 2, a system for optimizing copyright protection within an Artificial Intelligence (AI) system, in accordance with an aspect of the invention, is generally described with reference to numeral 200.

In use, a generative Artificial Intelligence (AI) model 202 sends a request to the databank 204 for a profiled data set.

The system 200 then compiles all relevant digital profiles matching the request 206. The system then creates a training data set 208 of only allowable profiled works.

The system 200 sends the requested training data set 208 to the generative AI model 402.

Figure 3:
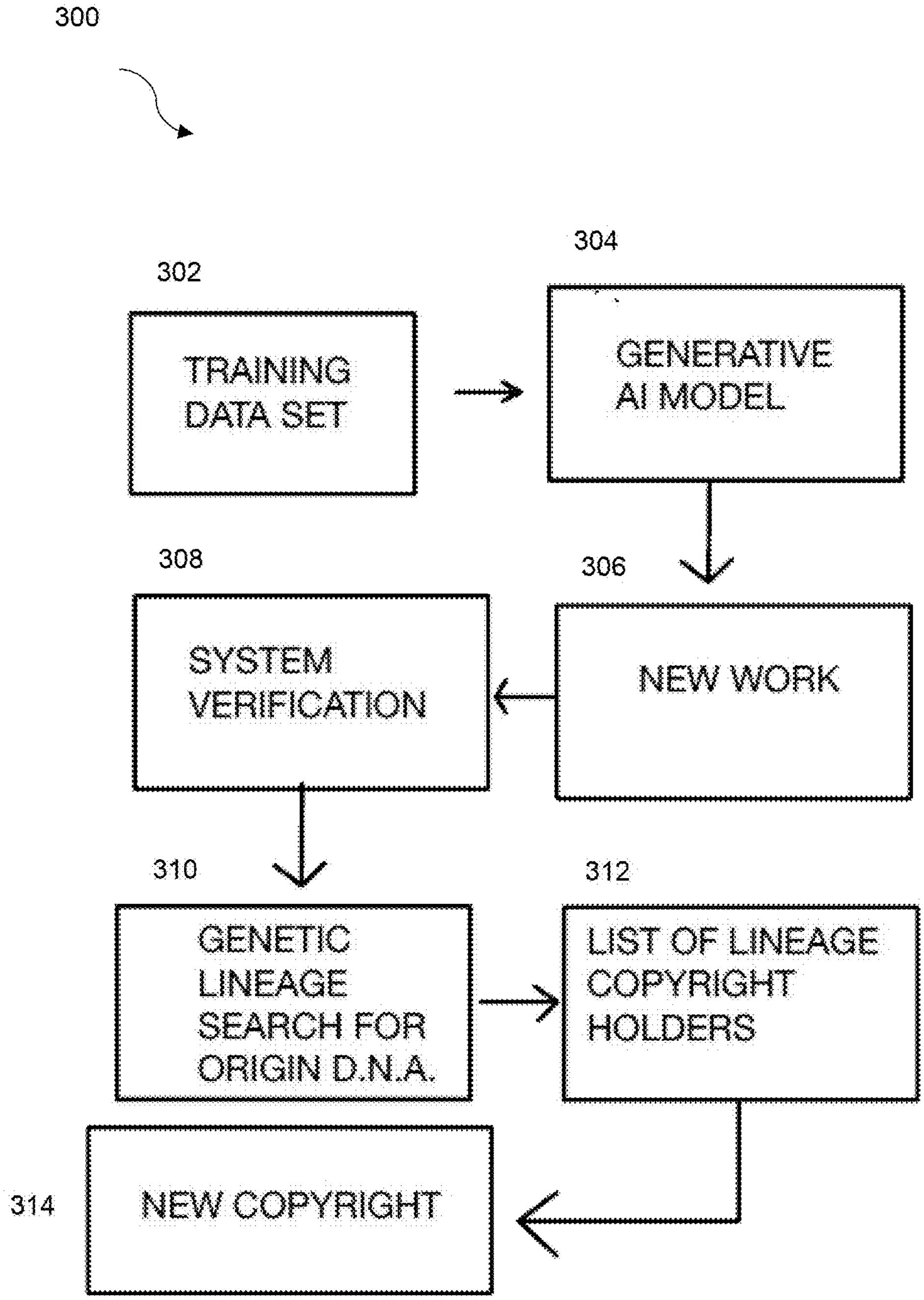
FIG. 3 shows a system for optimizing copyright protection within an Artificial Intelligence (AI) system, in accordance with an aspect of the invention.

In FIG. 3, a system for optimizing copyright protection within an Artificial Intelligence (AI) system, in accordance with an aspect of the invention, is generally described with reference to numeral 300.

In accordance with embodiments, one of the aspects of the invention is its ability to assess works generated by AI models which have previously been trained on both copyright works and other data, the origin of which precede this invention. An example is any AI model currently generating new or derivative works that cannot show any lineage to the original works which the AI model referenced during the generation of the new work.

The system 300 includes a training data set 302, a generative AI model 304, a new derivate work (that does not show any lineage to the original works referenced) 306, a system verification 308, a genetic lineage search 310, a list of lineage holders 312, new copyright 314.

In the system 300, the data training set 302 is used to train a generative AI model 304. The generative AI model 304 outputs a new work 306. The new work 306 is sent to the system 300 for verification 308. The system 300 analyses the new work 306 and conducts an automatic search 310, tracing back the lineage of the new work 306 to its source of origin 312.

A profile of the original copyright holders whose works were used as an influence in the AI generated work is extracted and an assignment token is created.

New copyright is then assigned to the new work 314 with the names of the original copyright holders as beneficiaries of the new work.

Figure 4:
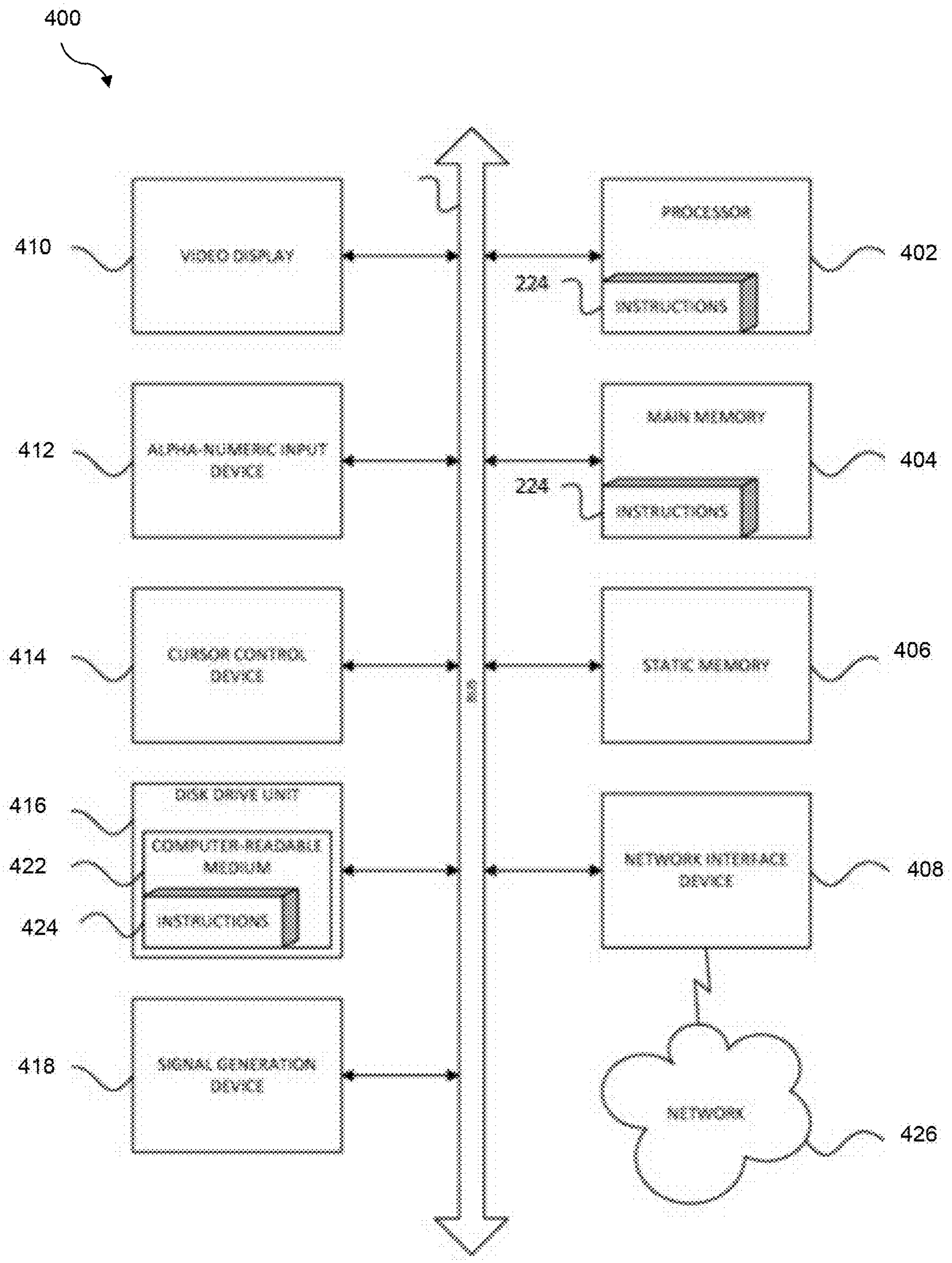
FIG. 4 shows a computer within which a set of instructions, for causing the computer to perform any one or more of the methodologies described herein, in accordance with aspects of the invention.

In FIG. 4, a computer within which a set of instructions, for causing the computer to perform any one or more of the methodologies described herein, may be executed. In accordance with embodiments of the invention, the computer is generally described with reference to numeral 400.

According to some embodiments, a computer 400 is disclosed which comprises: one or more processors; and a non-transitory computer-readable memory having stored therein computer-executable instructions, that when executed by the one or more processors, cause the one or more processors to perform actions comprising: analysing an original copyright work to formulate a unique digital profile of the work, storing one or more analysed copyright works along with their digital profiles, and upon a generative Artificial Intelligence (AI) model creating a new derivate work, tracing reference training data of the derivative work to identify one or more original copyright works that have informed the new derivative work.

In a networked deployment, the computer 400 may operate in the capacity of a server or a client machine in server-client network environment, or as a peer machine in a peer-to-peer (or distributed) network environment. The computer 400 may be a personal computer (PC), a tablet PC, a set-top box (STB), a Personal Digital Assistant (PDA), a cellular telephone, a web appliance, a network router, switch or bridge, or any computer 400 capable of executing a set of instructions (sequential or otherwise) that specify actions to be taken by that computer 400. Further, while only a single computer 400 is illustrated, the term "computer" shall also be taken to include any collection of computers that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer 200 may further include a video display unit 410 (e.g., a liquid crystal display (LCD)). The computer 200 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a computer-readable medium 422 on which is stored one or more sets of instructions and data structures (e.g., software 424) embodying or utilising any one or more of the methodologies or functions described herein. The software 424 may also reside, completely or at least partially, within the main memory 404 and/or within the processor during execution thereof by the computer system 400, the main memory and the processor also constituting computer-readable media. To this end, for clarity, please note that where the software 424 is not located in the main memory 404 and/or within the processor during execution thereof by the computer system 400, it will be in a cloud-based or remote storage location and may be executed directly from there.

The software 424 may further be transmitted or received over a network 426 via the network interface device 420 utilising any one of several well-known transfer protocols (e.g., HTTP, FTP).

In some embodiments the computer-readable medium 422 for carrying out the above-mentioned technical steps of the framework's functionality, is non-transitory in nature. The non-transitory computer-readable medium 422 has tangibly stored thereon, or tangibly encoded thereon, software 424 that when executed by a device (e.g., application server, messaging server, email server, ad server, content server and/or client device, and the like) cause at least one processor to perform a method for optimizing copyright protection within an Artificial Intelligence (AI) system. In accordance with one or more embodiments, a system is provided that comprises one or more computer systems 400 configured to provide functionality in accordance with such embodiments. In accordance with one or more embodiments, functionality is embodied in steps of a method performed by at least one computer. In accordance with one or more embodiments, software 424, program code (or program logic) executed by a processor(s) of a computer system 400 to implement functionality in accordance with one or more such embodiments is embodied in, by and/or on a non-transitory computer-readable medium 422.

While the computer-readable medium 422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer system 400 and that cause the computer system 400 to perform any one or more of the methodologies of the present embodiments, or that is capable of storing, encoding or carrying data structures utilised by or associated with such a set of instructions. The term "computer-readable medium" shall accordingly be taken to include, but not be limited to, solid-state memories and optical and magnetic media as well as cloud storage options (such as Amazon Webservices™, Microsoft Azure™, and the like).

Figure 5:
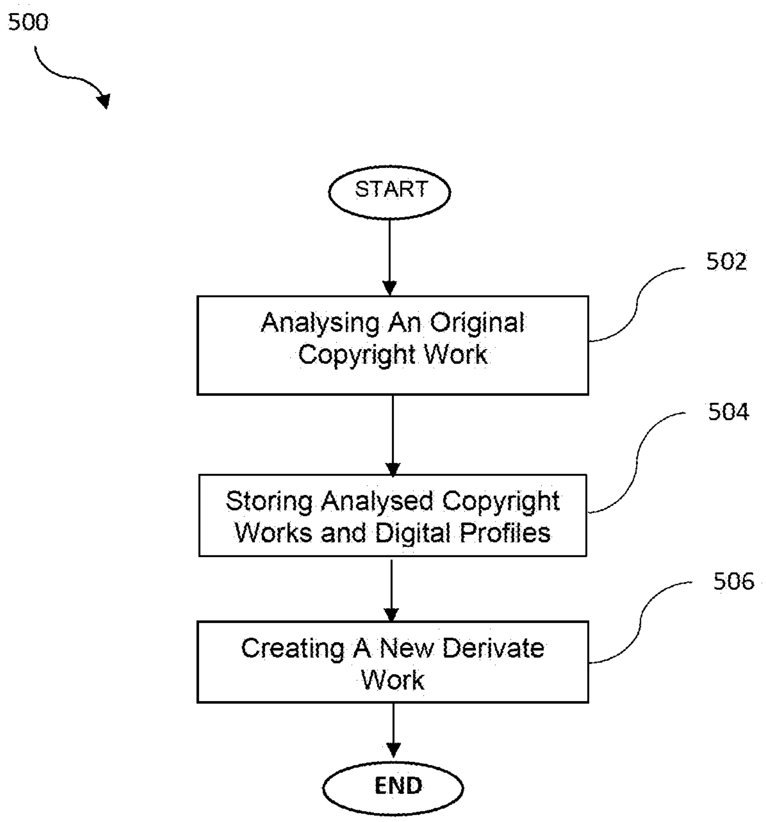
FIG. 5 shows a method of optimizing copyright protection within an Artificial Intelligence (AI) system, in accordance with aspects of the invention.

In FIG. 5, in accordance with the first aspect of the invention, the method of optimizing copyright protection within an Artificial Intelligence (AI) system, is generally described with reference to numeral 500.

The method 500 includes, at block 502, the step of analysing an original copyright work to formulate a unique digital profile of the work.

At block 504, the method includes the step of storing one or more analysed copyright works along with their digital profiles.

At block 506, upon a generative Artificial Intelligence (AI) model creating a new derivate work, tracing reference training data of the derivative work to identify original copyright works that have informed the new derivative work.

It is to be understood that the invention is not limited to the specific details described herein which are given by way of example only and that various modifications and alterations are possible without departing from the scope of the invention as defined in the appended claims.

The invention claimed is:

1. A method of optimizing copyright protection within an Artificial Intelligence (AI) system, including the following steps:

analysing an original copyright work to formulate a unique digital creative DNA profile of the work;

storing one or more analysed copyright works, and storing the respective digital creative DNA profile(s) associated with the one or more analysed copyright works in a databank; and upon a generative Artificial Intelligence (AI) model creating a new derivative work, performing a lineage check on the new derivative work to document its lineage, wherein said lineage check involves retrieving one or more creative DNA profiles from the databank, and identifying one or more corresponding original copyright works that have informed the new derivative work and influenced the AI model.

2. A method as claimed in claim 1, wherein the step of storing one or more analysed copyright works includes the step of establishing a content structure within the Artificial Intelligence (AI) system.

3. A method as claimed in claim 2, wherein the content structure outlines a central repository, such as a database, of the copyright works.

4. A method as claimed in claim 1, wherein each of the copyright works in the database will be automatically examined in detail before being allocated a distinct creative DNA digital profile.

5. A method as claimed in claim 1, wherein the database is provided in the form of a databank for all copyright holders and the unique digital creative DNA profiles associated with their copyright works.

6. A method as claimed in claim 1, wherein the digital profile and copyright database may be licensed to a third party, such as a developer for use in training their AI model.

7. A method as claimed in claim 6, wherein the system is accessible by third-party AI developers and may be used to keep new generative works safe from copyright infringement.

8. A method as claimed in claim 1, wherein the original copyright works are preserved, monitored, and faithfully transmitted.

9. A method as claimed in claim 1, wherein copyright holders for each piece of data are meticulously identified and documented, involving extensive cross-referencing and verification for accuracy.

10. A method as claimed in claim 1, wherein upon the Artificial Intelligence (AI) system creating a new derivative work, the method includes the step of identifying all the associated artists and rights holders who have influenced the new derivative work, to enable the artists and rights holders to be attributed as copyright beneficiaries of the derivative work.

11. A method as claimed in claim 1, wherein upon a generative AI model creating a new derivative work the AI model commences its training process.

12. A method as claimed in claim 1, wherein the generative AI model is built for the purpose of monitoring copyrighted data use.

13. A method as claimed in claim 1, wherein as the generative AI model generates derivative works, it continually tracks the use of copyrighted data, ensuring no loss of information.

14. A method as claimed in claim 1, wherein the generative AI model is operable to provide details of the original copyright holders.

15. A method as claimed in claim 1, wherein the model ensures that parent works are duly acknowledged and credited, to thereby preserve the rights and ensure recognition of the original creators and rights holders.

16. A method as claimed in claim 1, wherein the methodology, algorithm or set of criteria for copyright identification can be provided within an application tool.

17. A method as claimed in claim 1, wherein the copyright identification is facilitated through auto-training which includes one or more feedback loops.

18. A method as claimed in claim 17, wherein, upon identifying use of a copyright work, the copyright classification information (or reference data information related to what constitutes copyright work) can be fed back (e.g., a recursive loop) to the auto-training process for subsequent copyright identifications.

19. A method as claimed in claim 1, wherein the AI model is provided in the form of an automated learning model.

20. A method as claimed in claim 1, wherein a simplified method is provided for configuring data overlap for false positives vs. false negatives.

21. A method as claimed in claim 1, wherein a slider or other control for adjusting parameters of interest is provided.

22. A method as claimed in claim 1, wherein the new derivate work can be uploaded to the AI model and its origin accurately traced back the copyright work which influenced the AI model in initially creating the new derivative work.

23. A method as claimed in claim 1, wherein the unique creative digital DNA profile will be allocated to the respective copyright holder(s).

24. A method as claimed in claim 1, wherein each of the copyright holder(s) is provided with the option of providing training permission for their copyright work, in terms of which their creative digital DNA profiled work is made available for AI model training.

25. A method as claimed in claim 1, wherein only copyright works with training permissions will be eligible for training.

26. A method as claimed in claim 1, wherein creative digital DNA profiles without training permission will be prevented from being accessed for AI model training purposes.

27. A method as claimed in claim 1, wherein all new derivate works derived from the AI systems will have copyright holder permissions.

28. A method as claimed in claim 1, wherein all new derivative works will be attributed to the correct copyright holder(s) via a lineage check by documenting the lineage at the time of generation of the new derivative work, thus accurately tracing development right back to the original rights holders and their works that influenced the AI model.

29. A method as claimed in claim 1, wherein copyright holder(s) are provided with assurance that if their copyright work is used for training the AI model, they will own or co-own any derivative work that can be proven to have been influenced by their original work via the unique creative digital DNA profile attributed to it.

30. A method as claimed in claim 1, wherein the copyright holder(s) can be provided with ownership, either whole or partial, and a potential share of revenues from the exploitation of the new derivative work.

31. A method as claimed in claim 1, wherein the AI model employs a sophisticated algorithm to scrutinize digital Master Works, allowing for a unique creative digital DNA profile to be created for each of the copyright works it scrutinizes, albeit a literary, artistic or musical work such as music, books, photo images, paintings, films, sculpture, and the like.

32. A method as claimed in claim 1, wherein the method includes employing a generative or creative AI model, resembling a large language model (LLM), which generates new content.

33. A method as claimed in claim 32, wherein the AI model is trained on a library of books while considering the unique creative digital DNA profile of each work.

34. A method as claimed in claim 32, wherein the AI model actively tracks and records creative digital influences during content generation.

35. A method as claimed in claim 1, wherein the method includes employing a tracing and attribution algorithm.

36. A method as claimed in claim 35, wherein the method includes comparing the unique creative digital DNA profile of newly generated AI content with that of original works in the database.

37. A method as claimed in claim 35, wherein the algorithm is operable to attribute influences and potential copyright ownership based on identified similarities.

38. A method as claimed in claim 1, wherein the method includes employing a copyright attribution report generator.

39. A method as claimed in claim 38, wherein the copyright attribution report generator compiles essential information, including the newly created work, its unique creative digital DNA profile, and traced influences to generate a copyright attribution report.

40. A method as claimed in claim 39, wherein the report serves as a comprehensive record for copyright attribution purposes.

41. A method as claimed in claim 1, wherein the method includes employing an algorithmic analysis and profile assignment methodology.

42. A method as claimed in claim 41, wherein the method includes analysing a database of several million images.

43. A method as claimed in claim 42, wherein each image is assigned a unique creative digital DNA profile, such as a digital fingerprint, that encapsulates the images distinct artistic elements.

44. A method as claimed in claim 43, wherein the method includes an AI training and creative digital DNA profile recording methodology.

45. A method as claimed in claim 1, wherein the method includes training a generative AI model trained on a digital library or content database.

46. A method as claimed in claim 45, wherein the AI model is operable to learn and assimilate the DNA profile of each image.

47. A method as claimed in claim 45, wherein, as the AI model generates new art, it simultaneously records the creative digital influences from the original images it was trained on.

48. A method as claimed in claim 1, wherein the method includes the tracing and attribution of creative digital DNA profiles.

49. A method as claimed in claim 48, wherein the tracing and attribution algorithm is employed to compare the unique creative digital DNA profiles of AI-generated images with the original images' digital profile in the database.

50. A method as claimed in claim 48, wherein the algorithm is operable to identify and pinpoint the sources of influence in the new work, thus establishing a definitive lineage of unique creative digital DNA profiles from original works to new works.

51. A method as claimed in claim 1, wherein the method includes the step of generating a copyright attribution report.

52. A method as claimed in claim 51, wherein the copyright attribution report includes a compilation of all the information in a single, comprehensive report.

53. A method as claimed in claim 51, wherein the report provides a clear and accurate attribution of copyright to the original artists or copyright holders whose works influenced the AI's output.

54. A system for optimizing copyright protection within an Artificial Intelligence (AI) system, including:

a means of analysing an original copyright work to formulate a unique creative digital DNA profile of the work;

a databank configured to store one or more analysed copyright works and to store the respective digital creative DNA profiles associated with the one or more analysed copyright works; and a means of, upon a generative Artificial Intelligence (AI) model creating a new derivative work, performing a lineage check on the new derivative work to document its lineage, wherein said lineage check involves retrieving one or more creative DNA profiles from the databank and identifying one or more original copyright works that have informed the new derivative work and influenced the AI model.

55. A system as claimed in claim 54, wherein the system is operable to analyse each book within a database, assigning a unique creative digital DNA profile to each work.

56. A system as claimed in claim 55, wherein the system is operable to evaluate literary elements like theme, style, character development, and plot structure to generate distinctive identifiers.

57. A system as claimed in claim 54, wherein the system accesses a database containing a broad range of video clips or movies.

58. A system as claimed in claim 54, wherein the system analyses the video/film content stored in the database, breaking down each video/film into its essential elements, and assigning each a unique creative digital DNA profile.

59. A system as claimed in claim 58, wherein the essential elements may include plot, character development, cinematography, sound design, and more.

60. A system as claimed in claim 54, wherein the system traces the AI-generated work's digital profile back to its original sources in the database.

61. A system as claimed in claim 60, wherein the system is operable to accurately attribute copyright to the original creators and copyright holders, based on the digital tracing.

62. A system as claimed in claim 61, wherein the system includes a creative digital DNA profile analysis algorithm.

63. A system as claimed in claim 62, wherein the system includes a creative AI model, resembling a large language model (LLM), which generates new content.

64. A system as claimed in any of claims 62 or 63, wherein the AI model is trained on a database of patents while considering the unique creative digital DNA profile of each invention.

65. A system as claimed in claim 62, wherein the AI model actively tracks and records unique creative digital DNA profiles influences during new and novel invention generation.

66. A system as claimed in claim 54, wherein the algorithm is operable to analyse each patent within a database, assigning a unique creative digital DNA profile to each patent.

67. A system as claimed in claim 66, wherein the system is operable to evaluate novel and inventive elements of the patents and associated citations.

68. A system as claimed in claim 66, wherein the system includes a tracing and attribution algorithm.

69. A system as claimed in claim 61, wherein the tracing and attribution algorithm compares the unique creative digital DNA profile of a newly generated AI invention with that of prior art in the database.

70. A system as claimed in claim 66, the algorithm is operable to attribute influences and potential inventive ownership based on identified similarities.

71. A system as claimed in claim 54, wherein the system includes a copyright attribution report generator.

72. A system as claimed in claim 71, wherein the copyright attribution report generator compiles essential information, including the newly created novel invention, its unique creative digital DNA profile, and traced prior art influences.

73. A system as claimed in claim 71, wherein the report serves as a comprehensive record for inventor attribution purposes.

74. A system as claimed in claim 54, wherein the system includes a methodology for scanning 3-dimensional (3D) sculptures and other 3-dimensional art for compilation of or more 3-dimensional maps into a data bank.

75. A system as claimed in claim 74, wherein each 3-dimensional map is assigned a unique creative digital DNA profile.

76. A system as claimed in claim 74, wherein the system includes a generative AI 3-dimensional printing model.

77. A system as claimed in claim 74, wherein the AI model is used to create new 3-dimensional art through 3D printing.

78. A system as claimed in claim 74, wherein the AI model is operable to enable 3D mapping of the generated work to be analysed and influencing copyright to be assigned to the new work.

* * * * *